Figure 1:
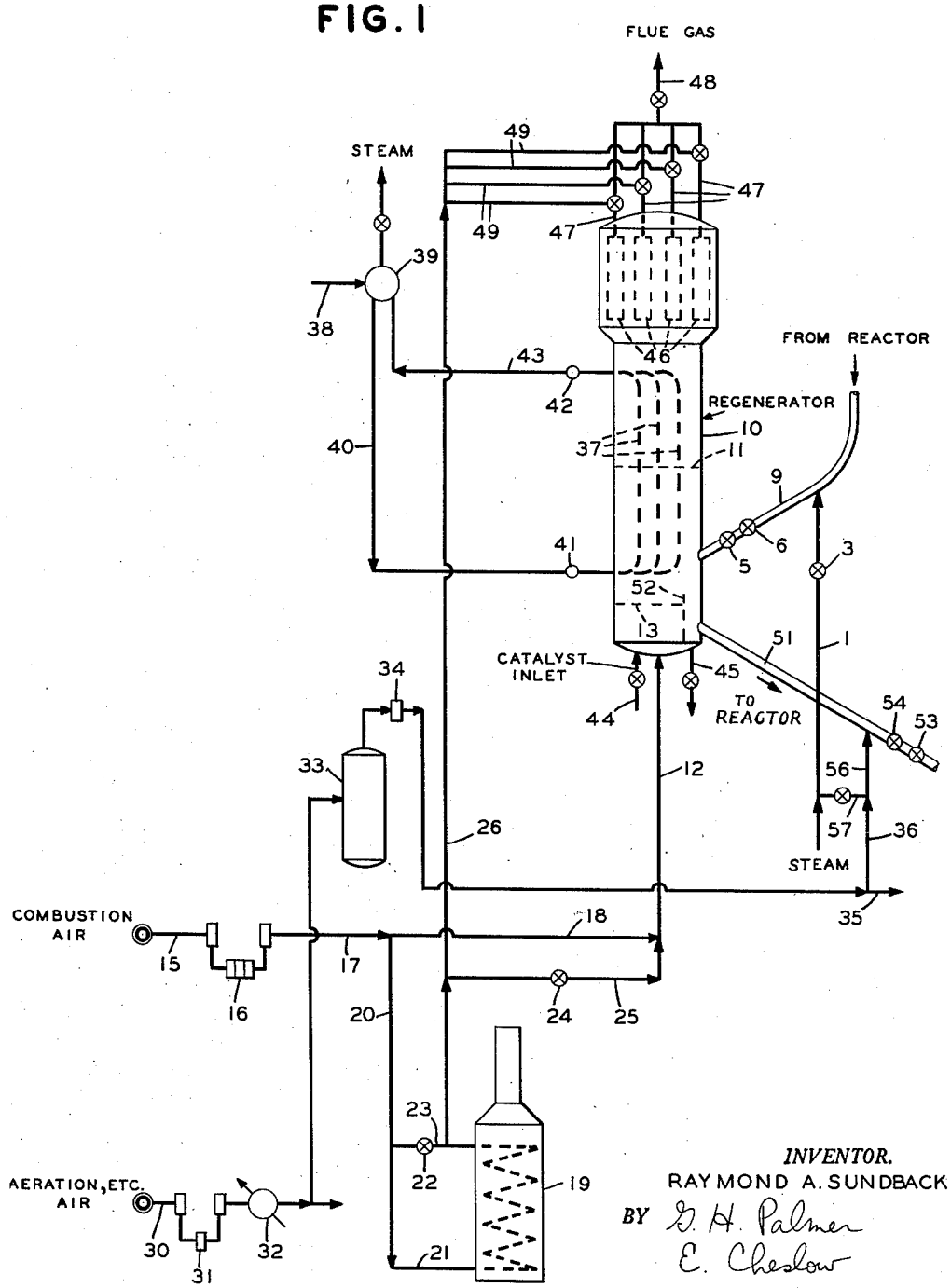

Oct. 23, 1956 R. A. SUNDBACK 2,768,144
CORROSION-RESISTANT FILTERS
Filed June 26, 1953 2 Sheets-Sheet 1

INVENTOR.
RAYMOND A. SUNDBACK
BY G. H. Palmer
E. Cheslow
ATTORNEYS

Oct. 23, 1956  R. A. SUNDBACK  2,768,144
CORROSION-RESISTANT FILTERS
Filed June 26, 1953  2 Sheets-Sheet 2

INVENTOR.
RAYMOND A. SUNDBACK
BY D. H. Palmer
E. Cheslow
ATTORNEYS

United States Patent Office 2,768,144
Patented Oct. 23, 1956

2,768,144

CORROSION-RESISTANT FILTERS

Raymond A. Sundback, Jersey City, N. J., assignor to The M. W. Kellogg Company, Jersey City, N. J., a corporation of Delaware Application June 26, 1953, Serial No. 364,341

12 Claims. (Cl. 252—417)

This invention relates to improvements in the separation of suspended solids from fluids, particularly from gases and vapors. More particularly, the invention relates to improvements in apparatus for the separation of finely divided solids contacted with a gas to effect treatment of the solid or the gas or both. Still more particularly, the invention relates to improvements in filters for the separation of finely divided solids from gases after maintaining contact between them in a contact zone which is maintained in a fluidized pseudo-liquid condition by passing the gas therethrough at suitable velocity. The treatments to be carried out in such contact zones include heat exchange between the gas and the solid, chemical reactions involving the gas as a reactant and involving the solid as a contact agent or catalyst or as a reactant, thermal conversion treatment by means of heat contained in the solid, combustion of carbonaceous deposits on the surfaces of the catalyst powders, and distillation of liquids contained in finely divided solids.

The invention is of particular utility in separating solids from corrosive gases or vapors at elevated temperatures. Many of the processes involving contact of finely divided solids and gases in a fluidized pseudo-liquid contact zone are operated at elevated temperatures and either deal with or produce gases or vapors which are highly corrosive. The combustion of carbonaceous deposits from the surfaces of catalyst powders used in hydrocarbon conversion is an example of such processes. The process is carried out at elevated temperatures, usually about 1100° F. or higher, and produces as a product of combustion a gas which is highly corrosive. The gas produced usually contains in addition to nitrogen and excess oxygen from the air, carbon dioxide, carbon monoxide, water vapor and, from the combustion of sulfur-containing deposits, sulfur dioxide and sulfur trioxide.

The invention will be described in detail by reference to a contact process in which a finely divided solid is maintained in a fluidized condition. However, since the invention is concerned particularly with the withdrawal of the gas or vapor from the contact zone while separating the finely divided solids therefrom, it is evident that the invention includes within its scope the separation of gases from finely divided solids without reference to the previous condition or relation of the solids and gas. It will be apparent that the various methods of operation to be described in more detail are applicable to the simple separation of a gas or vapor from finely divided solids suspended therein.

In contacting a gas with a fluidized powdered solid the finely divided or powdered solid is maintained in a suitable contact chamber. The gas is introduced into the contact chamber at a low point through one or more inlets whose aggregate cross-sectional area is substantially smaller than the horizontal cross-sectional area of the contact chamber. The gas stream thus enters the contact chamber through inlets in which it travels at a substantially higher velocity than the velocity assumed by the gas stream in the contact chamber. The velocity of the gas stream in the inlets is sufficiently high to prevent the passage of finely divided solids out of the chamber through such gas inlets. In operations of this character the gas ordinarily is passed up through the contact chamber at a relatively low superficial velocity in the range of 0.1 to about 6 feet per second. The superficial velocity is the velocity the gas or vapor would assume in the contact chamber in the absence of the finely divided solids and at the temperature and pressure to be employed in the process.

The finely divided solids ordinarily are employed in a range of particle sizes, including a large proportion of particles of 1 to 100 microns average diameter. The use of powders consisting of particles of substantially uniform size, in the form of small spheres, also has been suggested. The present invention is applicable to processes employing such "micro-spheres" as well as to processes employing powders having particles of different shapes and a range of sizes.

The passage of the gas stream upwardly through the solids mass at the preferred velocity suspends the solids mass in the stream and maintains the greater part of the solids mass in a fluidized pseudo-liquid condition in which the concentration of solid particles is relatively high. In this dense phase condition the solids may be said to be suspended in the gas stream but not entrained therein in the sense that there is movement of the mass, as such, in the direction of flow of the gas stream.

The dense phase of the solids mass occupies the lower part of the contact chamber, while the upper part of the chamber above the dense phase is occupied by a mixture of gases and powder in which the concentration of solids is much lower than the concentration of solids in the dense phase. This diffuse phase may be said to be a disengaging zone in which some of the solids lifted above the dense phase by the gas stream are disengaged and returned to the dense phase by the action of gravity. The gas stream is withdrawn from the contact chamber at an upper point thereof through an outlet somewhat larger than the gas inlet.

It is characteristic of this "fluidized" system of operation that the settling rate of at least some of the particles of the solids mass is lower than the gas velocity in the contact chamber. Consequently, the gas stream tends to entrain and carry out of the contact chamber a small, but appreciable, proportion of the solids mass. In order to retain such solids in the contact chamber, or recover such entrained solids and return them to the system, the contact chamber ordinarily is designed to provide a relatively large volume above the space occupied by the dense phase of the solids mass. This facilitates settling a large proportion of the solids carried upwardly out of the dense phase. To intensify this effect the upper part of the contact chamber may be enlarged in horizontal cross-section to reduce further the linear velocity of the gas stream and promote settling of suspended solids.

Simple settling, however, is not effective to remove all the suspended solids from the exit gas stream. To supplement settling, various means have been resorted to for separating further amounts of suspended solids from the exit gas stream. Cyclone separators have been employed and may be located within the contact chamber in the upper portion thereof or outside the chamber and connected with the exit line. Electrostatic precipitators have also been employed, and these are located outside the contact chamber and connected with the outlet line. Scrubbing the exit gas stream with liquids also has been employed. This separates the solids from the gas stream as a slurry of the solids in the scrubbing liquid. Filters have also been employed either in the upper part of the contact chamber occupied by the diffuse phase or outside the contact chamber and connected with the outlet line, or, as disclosed in the patent of Degnen et al., S. N. 2,548,875, within the fluidized pseudo-liquid mass.

Each of these means for separating solids from the gas stream from the contact chamber has certain disadvantages. Cyclone separators are relatively expensive and do not completely remove suspended solids. The latter is an especially serious disadvantage where an expensive catalyst, such as a platinum-containing catalyst, is used. Electrostatic precipitators will remove solids not removed by cyclone separators, and ordinarily are employed in conjunction with cyclone separators. However, electrostatic precipitators are expensive to install and maintain and operate efficiently only at relatively low temperature. Removal of solids by scrubbing ordinarily cools the gas stream and requires recovery of the solids from the resulting slurry.

Filters are subject to the limitations of the material of which they are composed. Metal filters used in the past have a very limited useful life when exposed to highly corrosive gases at high temperatures. Porous ceramic filters have been used but are disadvantageous in that they lack structural strength and are subject to cracks and breakage particularly when subjected to the stresses of temperature and pressure changes.

This invention has an object to provide filters which are capable of functioning without breakdown for long periods under severe corrosive conditions. A further object is to provide a porous filter material which combines the structural strength of porous metal filters with excellent corrosion resistance. Other objectives will appear hereafter.

These and other objectives are accomplished by the following invention. A filter is prepared out of a corrosion resistant filter material comprising porous chromium with oxidized surfaces. This material has been found to resist the effects of corrosive gases and temperatures of 1100° F. for prolonged periods and therefore produces superior filters.

Figure 1 illustrates the use of the filters of this invention as specifically applied in a preferred background to separate catalyst particles from the oxidized surface regeneration shown in a hydroforming plant. The spent catalyst from the hydroforming reactors enters the regenerator vessel 10 through standpipe 9. The standpipe 9 contains a slide valve 5 for automatically controlling the flow of solids and an auxiliary valve 6 for safety and control purposes. The catalyst in the standpipe is aerated by steam introduced through line 1 containing valve 3. The regenerator is a vertical cylindrical vessel having an effective internal diameter of about 2 feet 3 inches. This diameter takes into account any insulating material which lines the inside walls of the vessel. The overall length of the regenerator is 23 feet. Inside the regenerator, a catalyst bed having a level 11 is present. This catalyst bed can have a density of about 15 to 80 pounds per cubic foot. The catalyst is regenerated in this vessel by burning any contaminating deposits with an oxygen-containing gas which is introduced through a line 12 which is connected to the bottom of the regenerator. The oxygen-containing gas, e. g., air, enters the regenerator at a point below a grid plate 13 which serves to uniformly distribute the air over the cross-sectional area of the bottom of the vessel. This air is supplied through a supply line 15 at the rate of about 3,807 pounds per hour and is compressed by means of a compressor 16 to a pressure of 275 p. s. i. g. and a temperature of about 290° F. In this condition, the air may be introduced directly into the regenerator through lines 17, 18 and 12; or part of the air may be passed through a furnace 19 by means of lines 20 and 21, before being fed into the regenerator. In this example, the compressed air is passed directly into the regenerator without preheat by means of furnace 19. A portion of this compressed air stream, such as, for example, 540 pounds per hour, is heated to a temperature of 1100° F. by means of furnace 19 and is used as a blow-back for the filters shown in the top of the regenerator. Under normal operating conditions, valve 22 which is installed in the by-pass line 23 is kept closed; as well as valve 24 in line 25 which serves to introduce heated air into the regenerator. The heated air employed for blow-back of the filters in the regenerator is fed through line 26.

The air which is used for aeration and instrument control is supplied through a line 30. The air is compressed by means of a compressor 31 and thence cooled in a cooler 32. The cooled air passes into drum 33 wherein any liquid condensate is trapped. At this point, the air is under a pressure of 300 p. s. i. g. and a temperature of 100° F. The cooled air is then passed into a dryer 34 and thereafter is employed in instruments and for purposes of aeration. That portion of air which is used for the operation of instruments is supplied through a line 35, whereas the portion used for aeration is supplied through a line 36.

By contacting the air with spent catalyst in the regenerator, the temperature of the solids increases from the combustion of contaminating material. In the case of using 9 percent by weight of molybdenum oxide supported on alumina, the temperature of regeneration is maintained at about 1100° F. However, this temperature can be varied from about 850° to 1200° F. The temperature is maintained at this level by means of a plurality of vertical tubes 37 which are directly in contact with the catalyst bed in the regenerator. The heat of combustion is removed by heating water which is supplied from a line 38 into a boiler drum 39. The water flows from the boiler drum through a line 40 into a common header 41 which is located outside the regenerator and serves to distribute same through the vertical tubes which are disposed in the catalyst bed. The desired removal of heat is accomplished by heating and vaporizing the water. The heated water and steam which is formed in tubes 37 flow from the vertical tubes into a second common header 42 located outside the regenerator and then through a line 43 into drum 39, wherein the steam is separated and removed through an overhead valved line. The heated water is recycled through line 40, along with fresh water which is fed through supply line 38. The presence of a bed cooler in regenerator 10 can also serve as a means of controlling the temperature of regeneration by varying the height of catalyst bed in this zone. For this purpose, the banks of vertical tubes disposed within the regenerator should be of sufficient length, so that by varying the height of the catalyst bed in the regenerator, additional cooling surface is furnished, thus the temperature can be maintained within the desired operating range. The height of the catalyst bed in the regenerator can be varied by introducing additional catalyst through line 44 and by removing catalyst through line 45, both of which are connected to the bottom of the regenerator. Line 45 also serves to withdraw aged or low activity catalyst from the regenerator, whereas line 44 is also used to add fresh or high activity catalyst. Another method of varying the height of the catalyst bed in the regenerator is by varying the rate at which air is introduced through line 12. This technique will cause the density of the catalyst in the regenerator to change, and accordingly, the height of the bed will rise or fall depending upon the change in density which is effected. Ordinarily, the rate of combustion air which is fed to the regenerator is regulated to produce superficial linear gas velocities in the order of about 0.1 to 3 feet per second. Depending upon the cooling results desired, these gas velocities may or may not be sufficient alone to produce the desired cooling. If changing the air rate is not adequate for producing the required cooling, it may be then necessary to regulate the quantity of catalyst which is present in the regenerator, by withdrawing or adding same, as the case may be.

The flue gases leaving the catalyst bed in the regenerator usually contain entrained solids which are separated from the gaseous stream by means of filters 46, which are located in the upper enlarged section of the regenerator.

Figure 2:
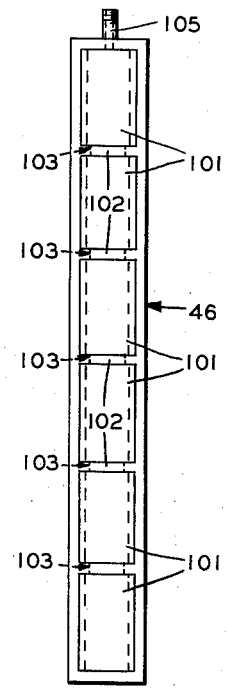
Figure 3:
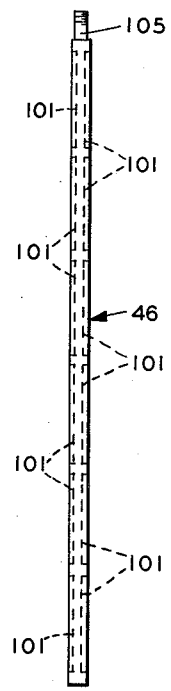
Figure 4:
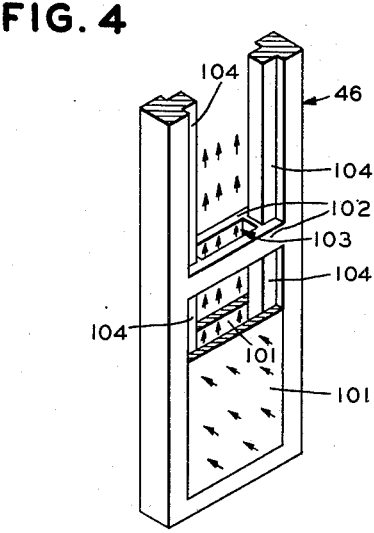

The filters are of the bayonet type, as shown in Figures 2, 3 and 4, and are made up of porous chromium rectangular plates 101 mounted in recesses 104 of the filter framework 46. Six porous plates, each 6 inches long by 3 inches wide, are mounted on each side of the filter frame, separated by the cross pieces 102. Slots 103 in the cross pieces provide communication and permit the gases passing through the porous plates to combine and flow upwardly through the filter and through threaded nipple 105. The porous plates are approximately ⅛ inch thick and are made of porous chromium hot-pressed and sintered to a density of approximately 70 percent that of substantially pure solid chromium and passivated or oxidized on the surfaces.

The separated gases within the filters leave the system through lines 47 which are connected to the filters 46, and particularly to nipples 105 of the filters, and thence flow through a valved exit line 48. However, after certain periods of operation these filters become coated with solid material on the outer surface. In order to improve the efficiency of operation and avoid the excessive pressure drop across the filters, these filters are blown back with a gas, such as, for example, air, through lines 49 which are connected to lines 47. The blow-back gas is supplied to lines 49 by means of line 26. As previously indicated, the air used for this purpose is heated to a temperature of about 1100° F. The air is heated to this temperature to minimize thermal shock effects. Although the filters of the present invention have enhanced resistance to the effects of mechanical and thermal shock it is nevertheless desirable to minimize them. By appropriate arrangement, these filters are blown back with a gas in a suitable manner without interrupting the operation of the unit. The regenerated catalyst leaves the bottom of the regenerator through a line or standpipe 51. This standpipe 51 is connected to the bottom of the regenerator where a segmental well is formed by a vertical transverse baffle 52. This standpipe is, for example, a pipe of 2½ inch diameter and contains a slide valve 53 for automatically controlling the flow of solids and an auxiliary valve 54 for safety and control purposes. The catalyst in this standpipe can have a density of about 15 to 50 pounds per cubic foot, or, in this example, about 36 pounds per cubic foot. This catalyst can be aerated with recycle gas through an aeration line 56 which is derived from the air supply line 36. The steam supply can also flow through a valved line 57 and be used to aerate regenerated catalyst in the standpipe 51 which is flowing to the reactor.

The passivated porous chromium filters of the present invention are prepared by powdered metallurgy techniques, and more particularly by subjecting chromium powders to hot compression, sintering and oxidation.

The porous chromium filters of this invention are actually complex in composition and in the distribution of the component elements. Chromium constitutes the essential metallic element of the filter and substantially pure chromium is used as a starting material. Fabrication of the filter in accordance with the method described below will result in some combination of chromium with nitrogen, some combination with carbon, some combination with oxygen and possibly some combination with sulfur. These non-metallic elements are concentrated in those regions which are close to the surface of the chromium particles or close to the surface of the filter pores. In overall concentration, however, the non-metallic elements may range from 10 percent to 20 percent by weight of the chromium. Metallic impurities are preferably kept at a minimum in the starting material and generally below 10 percent. Electrolytic chromium containing chromium in excess of 98 percent is preferred. It is to be understood that the term "chromium" as used herein is not restricted to pure elemental chromium, but includes up to 10 percent of metallic impurities and up to 20 percent of combined non-metallic elements.

The particle size of the chromium powders may vary with similar fabrication procedures. Coarser powders produce filters of better corrosion resistance and with lower pressure drop across them but with large pores, permitting passage of some fine particles. Very fine powders produce filters with very fine pores but with greater resistance to gas flow and with higher susceptibility to corrosion. In general, particles finer than 60 mesh and coarser than 325 mesh may be used. Within this range there is little difference in corrosion resistance.

The particles are placed in the graphite mold and compressed to about one-half the volume of the loose particles while being heated, usually by means of a high frequency induction coil. In order to minimize the formation of chromium carbide, it is preferred to coat the interior of the graphite mold with alundum paste. The temperature of the compression step may vary from about 1000° C. to about 1500° C., with the preferred temperature range being from about 1200° C. to about 1400° C. The temperature in different parts of the mold should be fairly uniform and at no point should the temperature approach the fusion temperature of chromium. The pressure may vary with the temperature, with the particle size and with the size and shape of the molded filter elements. In general, the pressure will range from about 200 to about 2000 pounds per square inch and preferably about 500 pounds per square inch.

The powder in the mold should be in a reducing or in a non-oxidizing atmosphere during the compression step. An oxidizing atmosphere results in the coating of the particles with oxide films and makes cohesion between them difficult. When graphite molds are used, no special steps need be taken to assure a reducing atmosphere since the oxygen in the air between the chromium particles reacts with a small amount of the graphite to produce carbon monoxide which is a reducing gas. With other types of molds, or, if desired, a reducing gas or an inert gas may be introduced into the mold.

The duration of the compression step may vary from a fraction of a second up to about 20 minutes or more with longer periods being preferred. Extended hot-pressing produces filters with better corrosion resistance than brief hot-pressing.

The hot compression step in a reducing or non-oxidizing atmosphere, when applied to relatively pure elemental chromium powder, results in chemical change, producing some nitrides and/or carbides of chromium in non-uniform distribution. This results in hot-pressed bodies with some tendency to crack. This tendency may be minimized by subjecting the chromium powder to treatment at elevated temperatures in a partially reactive atmosphere prior to hot-pressing. This treatment effects chemical changes similar to those of hot-pressing and thereby minimizes the chemical changes in the hot-pressing step. Treatment of chromium powder at temperatures in the range of about 1300° C. to 1500° C. is carried out in an atmosphere of nitrogen, carbon monoxide and/or hydrocarbon gases until a gain in weight of 10 to 15 percent takes place. This powder is then reground, if necessary, and subjected to hot-pressing, as described above.

It is generally desirable to sinter the pressed product in a non-oxidizing atmosphere after the compression step. Sintering for a period of at least ten minutes with a reducing gas, such as hot hydrogen, serves the dual purpose of reducing whatever small amount of oxide has formed to produce better bond between the particles and of annealing the porous body to relieve stress and increase its strength. Sintering with hot nitrogen may also be employed. The sintering step may vary in duration from ten minutes to several hours and in temperature from about 1100° C. to 1400° C., with the preferred temperature being no higher than 1300° C.

The density of the porous chromium will vary with the particle size of the powder and with the temperature, pressure and duration of the compression step. In general, the density will range from about 50 percent to about 80 percent of that of solid chromium metal and preferably from about 60 percent to about 75 percent.

The passivation or oxidation step is also carried out at elevated temperatures and preferably at a temperature of about 1000° C. The duration of the oxidation step may vary from about one hour to about twenty-four hours or more with most of the gain in corrosion resistance taking place in the first hour. The oxidizing gas is ordinarily air but any gas which is effective to oxidize chromium may be used. Oxidizing regeneration gas may be used to passivate a chromium filter so that the filter may be passivated in situ in the regenerator as it serves to filter catalyst particles from hot regeneration gas. Such a filter would commonly show lessened susceptibility to further corrosion after about one week under ordinary regeneration conditions. The oxidation treatment results in some relatively small decrease in physical strength of the sintered metal.

Small filters, in accordance with the present invention, can be fabricated as single units following the method described above. Larger filters are preferably fabricated in sections which are then assembled to produce the filters. For example, the bayonet filter of Figures 2, 3 and 4 may be fabricated from twelve sections of 6-inch length and 3-inch width, using six sections for each side of the filter. Assemblies of this type may be made in several ways. The bayonet filter, shown in the drawings, is prepared by brazing porous rectangular filter plates to a stainless steel frame. If desired, porous sections may be brazed to each other. Or, if desired, porous plates may be joined by hot-pressing in a mold with a thin layer of chromium powder joining the sections. In any case, the assembly should precede passivation since oxidized filter plates are difficult to join.

The passivated chromium filters of the present invention are extensively resistant to the corrosive effect of the high temperature gaseous products of catalyst regeneration. Table 1, below, represents the results of tests with a highly corrosive gas consisting of vaporized 14.8 weight percent $H_2SO_4$. At 1100° F. the $H_2SO_4$ is completely dissociated and at equilibrium the ratio $$\frac{SO_3}{SO_2}=1$$

The actual gas composition ran:

| | |
|---|---|
| $H_2O$ | 96.25 |
| $SO_3$ | 1.5 |
| $SO_2$ | 1.5 |
| $O_2$ | 0.75 |

All runs were for a period of seven days or 168 hours. The porous specimens were retained in a quartz tube while being subjected to the high temperature corrosive gas. The percent of weight increase of the porous material specimens was taken as an indication of their susceptibility to corrosion.

Table 1

| Material | Mesh Size of Powder | Percent Density | Hours Oxidized at 1,000° C. | Percent Weight Increase |
|---|---|---|---|---|
| Chromium | −60+80 | 69.6 | | 3.70 |
| Do | −60+80 | 72.6 | 1 | 0.33 |
| Do | −60+80 | 71.3 | 24 | 0.77 |
| Do | −80+100 | 68.0 | | 3.05 |
| Do | −80+100 | 71.2 | 1 | 0.49 |
| Do | −80+100 | 70.3 | 24 | 0.74 |
| Do | −100+200 | 73.3 | | 2.27 |
| Do | −100+200 | 76.1 | | 1.30 |
| Do | −100+200 | 73.8 | 1 | 1.18 |
| Do | −100+200 | 73.1 | 24 | 0.36 |
| Do | −100+200 | 70.6 | 24 | 0.56 |
| Stellite "J" a | −100+200 | 73.5 | | 1.30 |
| Do | −100+200 | 68.2 | ¼ | 2.37 |
| Do | −100+200 | 70.4 | 3¼ | 1.82 |
| 55Fe—37.5Cr—7.5Al | −325 | 61.2 | | b17.6 |
| Do | −325 | 59.8 | ½ | b10.3 |
| Do | −325 | 63.4 | 2 | b17.7 |
| Stellite 6 c | +100 | 62 | | 2.40 |
| 97Fe—3Si | Fe −60 | 51.2 | | 29.3 |
| 94Fe—6Si | Si −325 | 54.7 | | 26.0 |
| 50/50 Ferrosilicon | −100 | 76.5 | | 7.83 |
| Do | −60+100 | 87.7 | | 8.07 | a Nominal Composition—50Co—30Cr—20W.
b Part of sample fused with quartz container.
c Nominal Composition—60Co—34Cr—6W.

As may be seen from the above data, chromium filters subjected to an oxidizing gas at 1000° C. for at least one hour are superior in corrosion resistance both to unoxidized chromium and to other metals and alloys, either oxidized or unoxidized. Further testing of the unoxidized chromium samples of the above table showed that subjection of the same samples to an additional week under the same conditions resulted in weight increases approximately ⅓ as great as the weight increase of the first week. Since the tests were run under simulated regeneration conditions, it was concluded that passivation takes place under regeneration conditions.

Although the invention has been described with particular reference to the regeneration of hydroforming catalyst, it is to be understood that the passivated chromium filters are not restricted to use therein. They can be used to separate solid particles from many corrosive fluids, and particularly from oxidizing gases containing sulfur compounds. They can be used, for example, in other regeneration processes, as in the regeneration of cracking catalyst. They can also be used in catalytic processes wherein the desired product is sulfur-containing, as in the catalytic oxidation of sulfur dioxide to sulfur trioxide in the manufacture of sulfuric acid.

Other modifications and uses are obvious to those skilled in the art.

I claim:

1. A porous chromium filter with oxidized surfaces and containing not more than 10 weight percent of metallic impurities and from 10 to 20 weight percent of non-metallic elements.

2. A corrosion resistant filter material comprising sintered porous chromium with oxidized surfaces and containing not more than 10 weight percent of metallic impurities and from 10 to 20 weight percent of non-metallic elements.

3. A corrosion resistant filter material comprising sintered porous chromium with oxidized surfaces, said porous chromium having a density of from 50 percent to 80 percent that of solid chromium and containing not more than 10 weight percent of metallic impurities and from 10 to 20 weight percent of non-metallic elements.

4. A corrosion resistant filter material comprising sintered porous chromium with oxidized surfaces and containing not more than 10 weight percent of metallic impurities and from 10 to 20 weight percent of non-metallic elements and prepared by hot-pressing chromium powder finer than 60 mesh in a mold, sintering the hot-pressed powder in a reducing atmosphere and then subjecting the molded powder to high temperature oxidation.

5. The corrosion resistant material of claim 4 wherein the chromium powder is coarser than 80 mesh.

6. The corrosion resistant material of claim 4 wherein the chromium powder is finer than 80 mesh but coarser than 100 mesh.

7. The corrosion resistant material of claim 4 wherein the chromium powder is finer than 100 mesh but coarser than 200 mesh.

8. The method of separating finely divided solids from high temperature oxidizing gases which comprises passing said gases through a porous chromium filter with oxidized surfaces and containing not more than 10 weight percent of metallic impurities and from 10 to 20 weight percent of non-metallic elements.

9. The method of separating finely divided solids from high temperature oxidizing gases which comprises passing said gases through a corrosion resistant filter material comprising sintered porous chromium with oxidized surfaces and containing not more than 10 weight percent of metallic impurities and from 10 to 20 weight percent of non-metallic elements.

10. The method of separating finely divided solids from high temperature oxidizing gases which comprises passing said gases through a corrosion resistant filter material comprising sintered porous chromium with oxidized surfaces, said porous chromium having a density of from 50 percent to 80 percent that of solid chromium and containing not more than 10 weight percent of metallic impurities and from 10 to 20 weight percent of non-metallic elements.

11. In the regeneration of catalyst particles which have become deactivated in the hydroforming of sulfur-containing hydrocarbon fractions wherein said catalyst particles are contacted with an oxidizing gas in a fluidized contact zone, the improvement which comprises separating said catalyst particles from said oxidizing gas by passing said gas through a corrosion resistant filter material comprising porous chromium with oxidized surfaces and containing not more than 10 weight percent of metallic impurities and from 10 to 20 weight precent of non-metallic elements.

12. The regeneration process of claim 11 wherein said porous chromium is a sintered porous chromium having a density of from 50 percent to 80 percent that of solid chromium.

References Cited in the file of this patent

UNITED STATES PATENTS

| | | |
|---|---|---|
| 1,919,730 | Koenig et al. | July 25, 1933 |
| 2,133,995 | Lukens | Oct. 25, 1938 |
| 2,198,702 | Koehring | Apr. 30, 1940 |
| 2,267,372 | Calkins et al. | Dec. 23, 1941 |
| 2,554,343 | Pall | May 22, 1951 |